United States Patent Office 3,803,110
Patented Apr. 9, 1974

---

3,803,110
POLYMERS MADE FROM UNSATURATED MONOMERS AND POLAR SUBSTITUTED SATURATED MONOMERS
David Hugh Richards, Bishops Stortford, Norman Frederick Scilly, Sawbridgeworth, Frances Joan Williams, Buckhurst Hill, Essex, and Raymond Lloyd Williams, Bournemouth, England, assignors to National Research Development Corporation, London, England
No Drawing. Filed May 5, 1969, Ser. No. 822,867
Claims priority, application Great Britain, May 10, 1968, 22,264/68
Int. Cl. C08f 1/68, 13/00
U.S. Cl. 260—89.5 A                19 Claims

ABSTRACT OF THE DISCLOSURE

Alkenes are reacted with electron donors in the presence of comonomers having functional groups susceptible to nucleophilic attack such as halide or epoxy groups. The use of comonomers having one functional group produces comonomer-terminated alkene oligomers whilst the use of comonomers having at least two functional groups produces copolymers.

---

We have previously described (Chemical Communications, 1966, p. 38) how substituted alkenes,

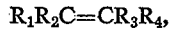

may be reacted with an electron transfer agent to form dicarbanions generally having the dimeric structure

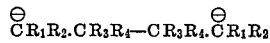

These may be isolated under inert conditions and treated with a reducing agent such as a halogen to yield a polymer having repeating units of the structure

where the substituted alkene starting material has "head-to-head" and "tail-to-tail" linked repeating units which may confer advantageous properties compared with the conventional "head-to-head" linked polymers produced by free-radical initiated polymerization of the alkene.

We have now discovered that when an alkene is reacted with an electron donor in the presence of a co-monomer having at least two functional groups susceptible to nucleophilic attack a copolymer is produced having repeating units comprising alkylene groups derived from the alkene and residues derived from the two functional groups from the co-monomer. The reaction mechanism is not known unequivocally, but it appears that the electron donor donates electrons to the monomer alkene under the reaction conditions to produce a dicarbanion which is normally a dimer, trimer or tetramer of the alkene. This dicarbanion then reacts rapidly with the second compound to yield a copolymer.

Thus, considering a typical case of a dicarbanion, ⊖[A]⊖, reacting in the presence of a difunctional co-monomer BX₂ where X represents a functional group, reaction would give a copolymer having units of the structure ⁅A—B⁆ according to the scheme:

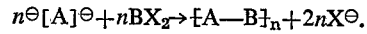

The dicarbanion would of course normally be associated with counterions, M⊕, which would combine with the functional groups X to give as reaction products the copolymer and MX.

Processes in accordance with the invention may be applied usefully to a wide range of alkenes. By alkene is meant a monomer having olefinic unsaturation and the term is used to embrace olefins, acetylenes and their respective substituted derivatives and, particularly, alkenes having the formula:

wherein, R₁, R₂, R₃ and R₄ are the same or different and represent a hydrogen atom, or a monovalent group including alkyl, alkenyl, aryl, aralkyl, alkaryl, alkoxy, aryloxy, alkoxycarbonyl, aryloxycarbonyl nitrile, heterocyclic and alicyclic groups. It will be appreciated that cyclic alkenes which are cyclic dienes and those cyclic alkenes which are substituted by any of the hereinbefore described groups R₁, R₂, R₃ and R₄ may also be used to give copolymer materials. The alkene preferably contains at least one electrophilic substituent group to activate a region of unsaturation (i.e. a double or triple bond) and thus facilitate attack by the electron transfer agent. Ethylene which of course does not have such an activating group cannot be used as the alkene.

Preferred alkenes which may be used to prepare copolymer materials are alkenes in which at least two, and sometimes three of R₁, R₂, R₃, and R₄ are hydrogen atoms i.e. alkenes incorporating methylene or vinyl groups. Suitable alkenes include butadiene, isoprene, styrene, α-methylstyrene, β-methylstyrene, ortho-methylstyrene, meta-methylstyrene, para-methylstyrene, 1,1-diphenyl ethylene, divinylbenzene, acetylenes, unsaturated esters notably those of methacryclic acid, and vinyl pyridines.

Co-monomers which may be reacted with the alkenes hereinbefore described to give co-polymers may have two or more functional groups.

Where the co-monomer has only two functional groups the co-polymers produced are predominantly linear. Thus where the reactant alkene is a vinyl monomer a linear thermoplastic is to be expected; and where the reactant alkene is a diene the product is expected to have elastomeric properties or to be the precursor of an elastomer.

Where the co-monomer has three or more functional groups the resulting copolymers are branched and/or cross-linked. It will be appreciated that by reacting an alkene with chosen proportions of a mixture of a difunctional and a trifunctional co-monomer a desired degree of branching or cross-linking may be introduced to give a copolymer product having desired characteristics.

Alternatively, a copolymer may be prepared from a difunctional co-monomer and an alkene such as a diene which will result in a substantially linear product containing a significant proportion of unsaturated linkages. The unsaturated linkages may then be activated to cross-link the copolymer by any conventional technique such as by heat, ultra-violet radiation or by a wide variety of known cross-linking agents such as peroxides or sulphur-based cross-linking agents. Thus, for example, butadiene and a difunctional co-monomer may be reacted to yield a liquid or solid rubber which requires only heat or a conventional free-radical catalyst to convert it to cross-linked (cured) material.

Another route to the introduction of unsaturation in a copolymer is to react the alkene with a co-monomer which possesses olefinic unsaturation. For example 1,4-dichloro but-2-ene might be used as co-monomer.

Suitable functional groups attached to the co-monomer include halogen (particularly chlorine and bromine) and the monovalent groups epoxy, non-enolizable keto, aldehyde, alkoxycarbonyl and aryloxycarbonyl, nitrile, acyl halide, and isocyanate and preferred difunctional co-monomers are thus dihalides, di-epoxides, diketones, di-aldehydes, di-esters, di-nitriles, di-acid chlorides or di-isocyanate compounds. The residue of a difunctional co-monomer is normally a divalent organic group but also can be wholly or partly inorganic, based on, for example, silicon or germanium.

Particularly convenient difunctional co-monomers are dihalides especially those in which the divalent residue is an organic group linked to halogen functional groups through alkylene groups since unwanted side-reactions are less likely than with dihalides in which the halogen atoms are directly linked to, for example, aryl groups. Advantageously, therefore, the residue is an alkylene group, or a di-alkylene substituted, aromatic or alicyclic group. It should be understood that references to alkylene, aromatic and alicyclic groups are intended to include substituted derivatives thereof, including halogeno-substituents, provided that in a process according to the invention the substituents are less reactive than the functional groups involved in formation of the copolymer. Particularly suitable dihalides are polymethylene $\alpha,\omega$-dihalides where $n$ is unity or at least three; o- and p-xylylene dibromides and dichlorides; 2,5 - dibromohexane, benzal bromide, 4,4-dichloro-methyl diphenyl sulphone, thionyl chloride, and other suitable co-monomers include pentaerythritol tetrachloride, mesitylene tribromide, dichloro-dimethylsilane, di-n-butyl dichlorogermane, epichlorhydrin, 2,2-bis-[4-(2,3-epoxypropoxy)phenyl] propane, toluene di-isocyanate, 4,4'-diphenyl methane diisocyanate, terephthaldehyde, benzoin, ethyl oxalate, and diethyl adipate.

It is an important aspect of a process in accordance with the invention that the co-monomer is present when a dicarbanion is produced by reaction between the alkene and the electron donor. In this way the dicarbanion may be converted rapidly and conveniently to the copolymer in situ. This procedure can avoid a difficulty of earlier procedures in which carbanion systems (the so-called "living" systems) had to be prepared and stored in relatively complex apparatus under high vacuum or inert atmosphere to prevent premature termination of the carbanions; and in which cumbersome separation and isolation of the carbanions before their termination with desired terminating groups, again under inert conditions, was often necessary. The present process avoids separation of the carbanion system before termination and may even permit the carbanion-forming reaction to be carried out in air provided that the reaction of the carbanion with the co-monomer is considerably faster than the reaction of the dicarbanion with the atmosphere. In general, the co-monomer should not be added to the reaction mixture before the alkene so that unwanted reactions between the electron donor and the co-monomer may thereby be avoided.

Electrons donors which may be used include conventional electron-donating systems such as lithium, sodium-potassium alloy, potassium, sodium, and possibly alkaline earth metals dispersed in an aprotic solvent such as tetrahydrofuran, the ethers diglyme, dioxan and tetramethylethylene-diamine, generally under an inert atmosphere. The aprotic solvent may be used in admixture with an inert solvent such as benzene or hexane. An excess of electron donor based on the theoretical quantity required to convert the alkene to the dicarbanion is preferred to ensure that good yields of dicarbanion are obtained. The formation of the dicarbanion may be transient only, since it will immediately on formation begin to react with the co-monomer to form the copolymer. The rate of reaction between the dicarbanion and the co-monomer may vary widely and is affected by the factors familiar to those skilled in this art such as concentrations of the reactants, temperature of reaction and steric consideration. The reaction temperature may be between about $+100°$ C. and $-100°$ C. but ambient temperature of 10–25° are normally adequate.

Alternatively, dicarbanions generated electrolytically may be reacted with the comonomer to give copolymers. In this case the electrolytic cell cathode acts as the electron donor and no additional electron donor is essential.

The relative proportions of the alkene and the co-monomer are preferably in a molar ratio of about 2:1 although proportions widely different may be used to give useful copolymers. The preferred relative proportions to give a particular polymer in a desired M.W. range each may be determined by experiment.

The formation of a dicarbanion may be encouraged by providing an electron transfer agent in the reaction mixture which forms a salt with the alkali metal or alkaline earth metal used. Thus, where the electron transfer agent is naphthalene and the alkali metal lithium, the lithium naphthalene formed will readily attack the alkene styrene to form the dicarbanion. The presence of an electron transfer agent has the additional advantages that the salt it forms reacts with undesirable impurities e.g. water, in the reaction mixture which otherwise might prematurely terminate the carbanion; and that the salt is highly colored so that when all the reactant alkene has been converted via the dicarbanion to a copolymer the end-point of the reaction is indicated by the appearance of the characteristic color of the salt.

The present process offers a route to virtually limitless numbers of copolymer materials, a large proportion of which are likely to be novel compositions. Furthermore, the present process allows the properties of two or more known polymer systems to be blended readily to give a copolymer some of the desirable characteristics of each parent polymer. For example, a process in accordance with the invention between, say, the alkene styrene, $$CH_2=CHPh$$

and the $\alpha,\omega$-dihalide p1xylylene dihalide, produces copolymers having properties intermediate those of polystyrene and poly(p-xylene). Similarly a co-polymerization between, say, butadiene and a polyimide precursor would be expected to give rise to a polyimide modified rubber with unusual properties.

Further, a copolymerization between butadiene and the $\alpha,\omega$-dihalides  give copolymer materials with properties varying between polybutadiene and polymethylene according to the value of $n$.

Copolymer materials produced by the present process may of course have molecular weights within a wide range but are most commonly within the range of 2,000 to 30,000.

It will be appreciated that the invention is not limited to reactions between a single alkene and a single co-monomer and that two or more of each class of reactant may be reacted to give copolymer materials.

For example, styrene and butadiene in various proportions have been reacted with certain co-monomers such as α,ω-dibromobutane and para-dibromoxylene. Furthermore, butadiene has been copolymerized with various mixtures of the afore-mentioned monomers. Polyalcohols with different functionalities have been synthesized by reacting butadiene with a range of mixtures of α,ω-dibromobutane and epichlorhydrin.

It also may be possible to carry out a process in accordance with the invention between one or more polymeric starting materials. Thus, a halogen terminated polymer molecule may be considered a difunctional α,ω-dihalide; a polymeric molecule having unsaturated end groups may provide the alkene for reaction with a co-monomer; an isocyanate terminated short chain polymer can be regarded as a difunctional co-monomer.

Numerous modifications of processes in accordance with the invention may be envisaged. For example halogen terminated polymers may be formed by using a calculated excess of a dihalide as difunctional co-monomer. Similarly, copolymers having predetermined terminal functional groups may be produced by the addition of a small amount of a suitable terminating agent giving end groups such as carboxyl or hydroxyl. Such terminating agents could be, for example, ethylene oxide to give hydroxy termination and classes of compounds having the general formulae XRO⁻M⁺ and XROO⁻M⁺ where X is a halogen and M is an alkali metal to give hydroxy and carboxy termination respectively.

From the foregoing it is apparent that when the co-monomers used are entirely monofunctional copolymers will not be produced and the reaction products will contain primarily small molecules having the general formula B—A—B, wherein A represents the generated dicarbonion residue and B represents a liquid of the monofunctional co-monomer. Although these small molecules do not exemplify the co-polymers with which the present invention is primarily concerned they may be very valuable compounds in themselves or useful precursors of valuable materials and the processes herein described may represent the only practicable route to the said small molecules. Certain small molecules may be of particular theoretical interest—for example, butadiene reacts with a mono-functional alkyl halide HRX (where R represents an alkylene chain) to give (ignoring cis- and trans-conformations) three distinct products:

(1)    HR—CH₂—CH=CH—CH₂—CH₂—CH=CH—CH₂—RH
(2)    HR—CH₂—CH=CH—CH₂—CH₂—CH—RH
                                    |
                                    CH=CH₂
(3)    HR—CH₂—CH—CH₂—CH₂—CH—RH
              |                |
              CH=CH₂        CH=CH₂

These correspond to the 1:4, 1:4 addition product, the 1:4, 1:2 product and the 1:2, 1:2 product respectively and the proportions of each and their respective properties may be readily determined. Other examples of the production of small molecules from alkenes and monofunctional co-monomers are described hereinafter in Examples 5 and 6.

Typical processes in accordance with the invention will now be described, by way of example only, in order to illustrate the invention.

EXAMPLE 1

Lithium (about 1 mole), divided into small pieces, is added under a nitrogen atmosphere to tetrahydrofuran (500 mls.) contained in a reaction vessel. Styrene (0.4 mole) and α,ω-dibromobutane (0.2 mole) are then mixed and added to the reaction vessel. Reaction is allowed to proceed at room temperature for four hours and the reaction mixture is filtered and the filtrate added to methanol. A precipitate of copolymer is obtained which after isolation and drying may be shown to contain units of the structure

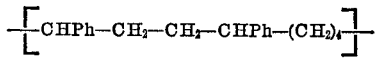

EXAMPLE 2

Butadiene is passed from a cylinder through drying tubes and condensed under vacuum in a measuring cylinder. 0.2 mole of the butadiene is then distilled into a reaction vessel containing finely-divided lithium (about 1 mole), α,ω-dibromodecane (0.1 mole) and tetrahydrofuran (250 mls.). Reaction is continued for about three hours and the product isolated as in Example 1. The isolated product is a copolymer which may be shown to contain units having the empirical formula

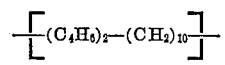

EXAMPLE 3

Lithium (about 5 parts by weight), divided into small pieces, is added under nitrogen atmosphere to tetrahydro furan contained in a reaction vessel. α-Methyl styrene (2 parts) and the p,p′-diglycidyl ether of 2,2′-diphenylolpropane (1 part) having the formula

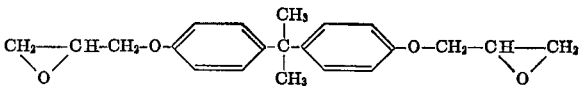

are added to the reaction vessel. Reaction is allowed to proceed at room temperature for four hours and the reaction mixture is filtered and the filtrate added to water whereupon a copolymer having the empirical formula $C_{39}H_{46}O_4$ is formed.

The mechanism of the reaction is somewhat different to the simple elimination of alkali metal halide as in Examples 1 and 2. The lithium salt of the methylstyrene dicarbanion, which may be represented as $Li_2^+[A]^{2-}$, reacts (considering only one end of the epoxide molecule) in two possible ways as follows:

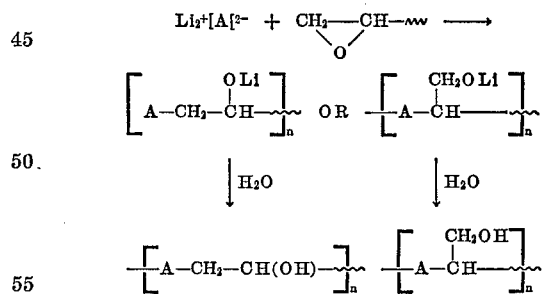

EXAMPLE 4

Butadiene (0.2 M 15 mls. at —78° C.) epichlorhydrin (0.1 M 9.25 g.) and lithium (3 g.) were reacted at —15° C. in tetrahydrofuran (200 mls.) for 5 hours and the product precipitated from petrol (60°–80°). The resulting precipitate was washed with ether/water mixture and the ether layer dried and evaporated to a viscous liquid copolymer having a hydroxyl value 8.96% (theoretical 9.1%, for the repeat unit

The foregoing Examples 1–4 exemplifying an extremely small part of the range of copolymers available from processes in accordance with the invention. The following Tables I and II clearly demonstrate the variety of copolymers available from some common alkenes using only one type of difunctional co-monomer, a dihalide.

TABLE I

| Monomer | Co-monomer dihalide [1] X—R—X where R is— | Aliphatic/aromatic H ratio | | Specific viscosity |
|---|---|---|---|---|
| | | Theory | Experiment | |
| Styrene | —CH$_2$— | 0.8 | 0.82 | 0.063 |
| | —(CH$_2$)$_3$— | 1.2 | 1.18 | 0.085 |
| | —(CH$_2$)$_4$— | 1.4 | 1.35 | 0.128 |
| | —(CH$_2$)$_5$— | 1.6 | 1.50 | 0.163 |
| | —(CH$_2$)$_6$— | 1.8 | 1.80 | 0.144 |
| | —(CH$_2$)$_{10}$— | 2.6 | 2.50 | 0.137 |
| | —CH(CH$_3$)(CH$_2$(CH$_3$)CH— | 1.8 | 1.70 | 0.067 |
| | p.—CH$_2$C$_6$H$_4$.CH$_2$— | 0.71 | 0.72 | 0.096 |
| | o.—CH$_2$C$_6$H$_4$CH$_2$— | 0.71 | 0.69 | 0.052 |
| α-Methylstyrene | —CH$_2$— | 1.2 | 1.24 | 0.045 |
| | —(CH$_2$)$_3$— | 1.6 | 1.53 | 0.099 |
| | —(CH$_2$)$_4$— | 1.8 | 1.81 | 0.120 |
| | —(CH$_2$)$_5$— | 2.0 | 2.00 | 0.143 |
| | —(CH$_2$)$_6$— | 2.2 | 2.33 | 0.149 |
| | —(CH$_2$)$_{10}$— | 3.0 | 3.04 | 0.163 |
| | p.—CH$_2$C$_6$H$_4$CH$_2$— | 1.0 | 0.92 | 0.108 |
| | o.—CH$_2$C$_6$H$_4$CH$_2$— | 1.0 | 0.95 | 0.070 |
| | (CH$_3$)$_2$SiCl$_2$ | 1.6 | 1.60 | |
| β-Methylstyrene | —(CH$_2$)$_4$— | 1.8 | 1.92 | 0.118 |
| o-Methylstyrene | —(CH$_2$)$_4$— | 2.5 | 2.32 | 0.115 |
| m-Methylstyrene | —(CH$_2$)$_4$— | 2.5 | 2.55 | 0.105 |
| p-Methylstyrene | —(CH$_2$)$_4$— | 2.5 | 2.49 | 0.126 |
| 4-Vinyldiphenyl | —(CH$_2$)$_4$— | 0.78 | 0.77 | 0.077 |
| 1,1-Diphenylethylene | —(CH$_2$)$_3$— | 0.50 | 0.54 | 0.088 |
| Methylmethacrylate | —(CH$_2$)$_5$— | [2] 0.30 | [2] 0.29 | |

[1] All are dibromides unless otherwise stated.
[2] Ratio of hydrogens of methyl ester to all other hydrogens.

TABLE II

| Monomer | Co-monomer dihalide [1] X—R—X where R is— | Specific viscosity | Aliphatic/aromatic ratio | | Form |
|---|---|---|---|---|---|
| | | | Theory | Experiment | |
| Butadiene | —(CH$_2$)— | 0.207 | | | Viscous oil. |
| | —(CH$_2$)$_2$— | 0.163 | | | Do. |
| | —(CH$_2$)$_3$— | 0.200 | | | Do. |
| | —(CH$_2$)$_4$— | 0.214 | | | Do. |
| | —(CH$_2$)$_5$— | 0.178 | | | Do. |
| | —(CH$_2$)$_6$— | 0.224 | | | Do. |
| | —(CH$_2$)$_{10}$— | 0.166 | | | Do. |
| | p.—CH$_2$C$_6$H$_4$CH$_2$— | 0.217 | 4.0 | 3.9 | Rubbery solid. |
| | ClC(Ph)$_2$Cl | 0.042 | 1.2 | 1.0 | Do. |
| Isoprene | —(CH$_2$)— | 0.04 | | | Viscous oil. |
| | —(CH$_2$)$_2$— | 0.051 | | | Do. |
| | —(CH$_2$)$_3$— | 0.057 | | | Do. |
| | —(CH$_2$)$_4$— | 0.118 | | | Do. |
| | —(CH$_2$)$_5$— | 0.081 | | | Do. |
| | —(CH$_2$)$_6$— | 0.072 | | | Do. |
| | —(CH$_2$)$_{10}$— | 0.100 | | | Do. |
| | p.—CH$_2$C$_6$H$_4$CH$_2$— | 0.158 | 5.0 | 4.6 | Rubbery solid. |
| | ClC(Ph)$_2$Cl | 0.042 | 1.6 | 1.5 | Do. |

[1] Dibromides unless otherwise stated.

EXAMPLE 5

A mixture of ethanol (9.1 g.) and α-methylstyrene (23.6 g.) was added to a stirred suspension of lithium (2.8 g.) in tetrahydrofuran (100 ml.) during 15 min., at 25–35°. After 4 hr. at this temperature the mixture was filtered and the solvent evaporated. The residue was shaken with water, extracted with light petroleum and dried (sodium sulphate). Evaporation of the solvent and distillation gave 2,5-diphenylhexane (16.2 g.), B.P. 140°/1.5 mm. and a residue (4.2 g.).

The residue was separated by preparative t.l.c. on Kieselgel G using light petroleum as the developing agent. The two major components obtained were shown, by comparison of their n.m.r. spectra with those from authentic material to be the trimer and tetramer of α-methylstyrene.

EXAMPLE 6

A mixture of α-methylstyrene (23.6 g.) and 2-phenethylbromide (37 g.) was added to lithium (2.8 g.) in tetrahydrofuran (100 ml.) After 4 hr. at 24–35° the solution was filtered, the filtrate evaporated to remove solvent, and the residue shaken with water, extracted with ether, and dried (sodium sulphate). The solvent was evaporated leaving a pale straw-colored viscous oil (37.0 g.). This oil (1.0 g.) was separated into one major (0.82 g., 3,6-dimethyl 1,3,6,8-tetraphenyloctane), and two minor components by t.l.c. on Kieselgel G with light petroleum.

EXAMPLE 7

Styrene (0.4 mole), dibromobutane (0.2 mole) and sodium (1.0 mole) were reacted as in Example 1 to give the corresponding copolymer.

We claim:

1. A process for the manufacture of an alkene copolymer which comprises reacting in an aprotic solvent an alkene of the formula $R_1R_2C=CR_3R_4$ wherein $R_1$, $R_2$, $R_3$ and $R_4$ may be the same or different and represent a hydrogen atom or a monovalent group including alkyl, alkenyl, aryl, aralkyl, alkoxy, aryloxy, nitro, alkoxycarbonyl, aryloxycarbonyl, acid chloride, nitrile and alicyclic groups with a molar excess of an electron donor selected from the group consisting of alkali metals, alkaline earth metals, mercury amalgams of alkali metals, and electrolytic cell cathodes, to form an alkene dicarbanion consisting of from two to four linked alkene monomer residues, in the presence of a comonomer having two functional groups susceptible to nucleophilic attack, said two functional groups being two halogen groups, two epoxy groups, or one epoxy and one halogen group, whereby the carbanions of the alkene dicarbanion attack said functional groups to form an alkene copolymer comprising alkene dicarbanion residues and divalent co-monomer residues.

2. A process according to claim 1 and in which the alkene and the co-monomer are reacted in a molar ratio of about 2:1.

3. A process according to claim 1 and in which the co-monomer is ortho- or para-xylylene dibromide, 2,5-dibromohexane, benzal bromide, 4,4 - dichloro - diphenyl sulphone, thionyl chloride, dichloro dimethylsilane, di-n-butyl dichloro germane, epichlorhydrin or 2,2-bis[4-(2,3-epoxypropoxy)phenyl]propane.

4. A process according to claim 1 and in which the reaction is carried out in an aprotic solvent admixed with an inert organic solvent.

5. A process according to claim 1 and in which reaction is carried out at a temperature between $-100°$ C. and $+100°$ C.

6. A process according to claim 1 wherein the electron donor is lithium, sodium, potassium, or sodium-potassium alloy.

7. A process according to claim 1 and in which reaction is carried out in an electrolytic cell which provides electrons for reaction with the alkene.

8. A process according to claim 1 and in which an electron transfer agent is provided which forms a salt with the electron donor.

9. A process according to claim 1 wherein the aprotic solvent is tetrahydrofuran, diglyme, dioxan or tetramethylethylenediamine.

10. A process according to claim 4 wherein the inert organic solvent is benzene or hexane.

11. A process according to claim 1 and in which the alkene is reacted with the electron donor and a co-monomer having only two functional groups susceptible to nucleophilic attack whereby a substantially linear copolymer is produced.

12. A process according to claim 1 wherein two of the substituents $R_1$, $R_2$, $R_3$ and $R_4$ are hydrogen atoms.

13. A process according to claim 1 wherein three of the substituents $R_1$, $R_2$, $R_3$ and $R_4$ are hydrogen atoms.

14. A process according to claim 1 wherein the alkene is butadiene, isoprene, styrene, $\alpha$-methylstyrene, $\beta$-methylstyrene, ortho-methylstyrene, meta-methylstyrene, para-methylstyrene, methyl methacrylate, or divinyl benzene.

15. A process according to claim 1 and in which the alkene is a cyclic alkene which is a diene.

16. A process according to claim 1 and in which the alkene is a cyclic alkene substituted by any of the groups $R_1$, $R_2$, $R_3$ and $R_4$ hereinbefore defined in claim 1.

17. A process according to claim 1 and in which the alkene has at least one electrophilic group to activate a region of unsaturation in the alkene.

18. A process according to claim 1 and in which the functional groups of the co-monomer are chloro, bromo, or epoxy.

19. A process according to claim 1 and in which the co-monomer is an $\alpha,\omega$-dihalide $(CH_2)_nX_2$ wherein X represents halogen and $n$ is unity or at least three.

References Cited

UNITED STATES PATENTS

| | | | |
|---|---|---|---|
| 3,004,961 | 10/1961 | Hauptschein | 260—92.1 |
| 3,077,467 | 2/1963 | Gurgiolo | 260—94.2 |
| 3,159,589 | 12/1964 | Bloomfield | 260—2 |
| 3,342,777 | 9/1967 | Howard, Jr. | 260—63 |
| 3,345,332 | 10/1967 | Hoyt | 260—47 |
| 3,347,825 | 10/1967 | Hoyt | 260—47 |
| 3,349,069 | 10/1967 | Davis | 260—92.3 |
| 3,359,239 | 12/1967 | Koch | 260—47 |
| 3,386,899 | 6/1968 | Shepard | 204—59 |
| 3,135,716 | 6/1964 | Uraneck | 260—45.5 |
| 3,468,972 | 9/1969 | Hsieh | 260—836 |
| 3,193,538 | 7/1965 | Canterino | 260—86.3 |
| 3,318,862 | 5/1967 | Hinton | 260—94.2 M |

FOREIGN PATENTS

| | | | |
|---|---|---|---|
| 780,945 | 3/1968 | Canada | 260—29.7 |
| 524,668 | 5/1931 | Germany | 260—94.2 M |
| 945,122 | 12/1963 | Great Britain | 260—94.2 M |

OTHER REFERENCES

Litt, M. Chem. Abst. 67, 44120b.

Sorenson, W. R., et al., Preparative Methods of Polymer Chem., Interscience, New York, pp. 161, 198 (1961).

Chemical Abst., 67, 43484m (article in Chem. Commun. by R. L. Williams).

JOSEPH L. SCHOFER, Primary Examiner

C. A. HENDERSON, Jr., Assistant Examiner

U.S. Cl. X.R.

204—59, 159.14; 260—2 R, 47 EP, 47 UA, 51 R, 63, 73, 77.5 CR, 79.3 R, MU, 80 L, M, P, 85.3 R, 85.5 XA, 86.3 R, 87.5 R, 88.7 R, 91.1 R, 93.5 R, 93.7 R, 94.1 R, 94.2 R, 94.9 R, 465.1, 469, 478, 486, 543 R, 611 R, 644, 651 R, 665 R, 666 A, 668 R